Patented Oct. 31, 1939

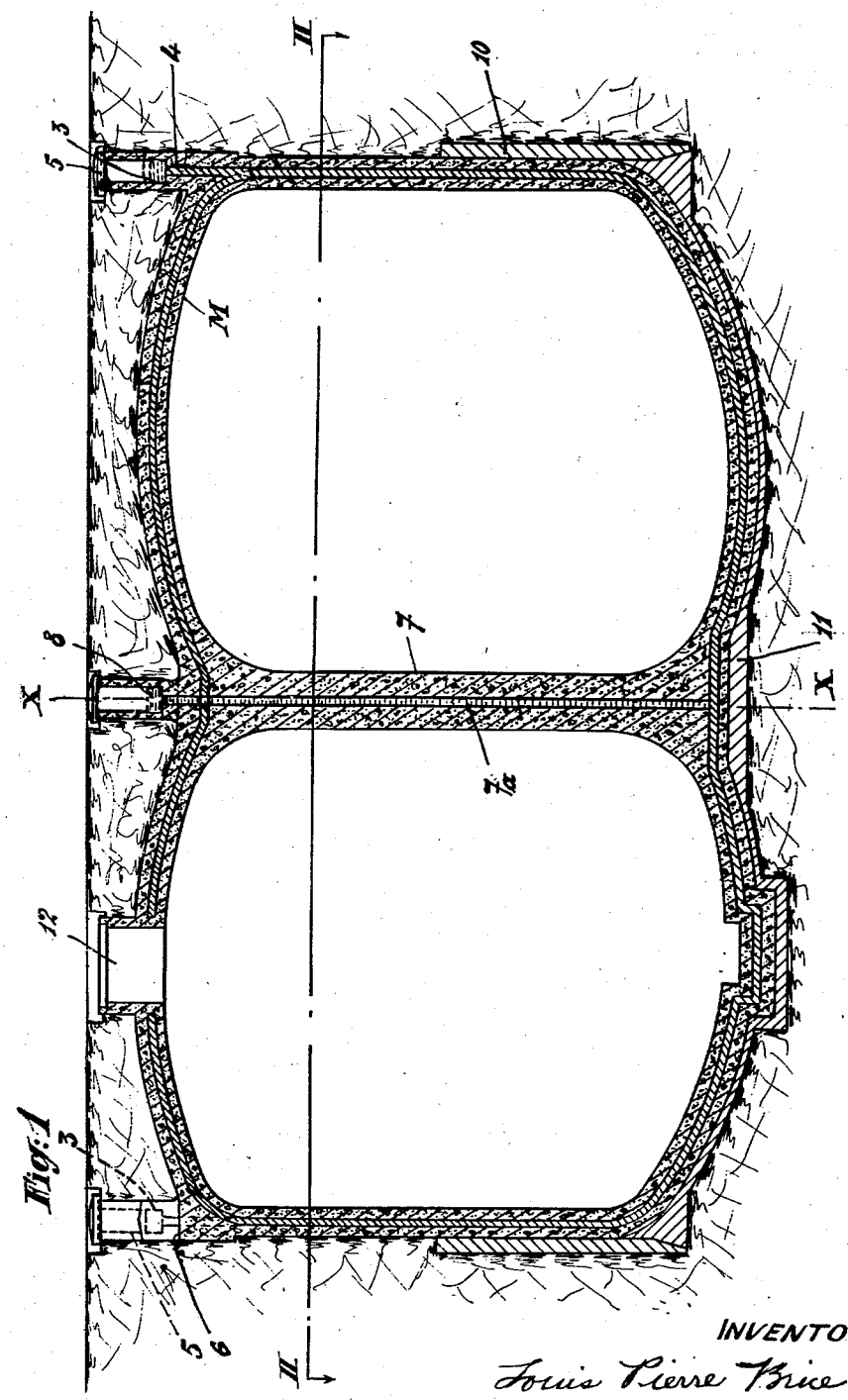

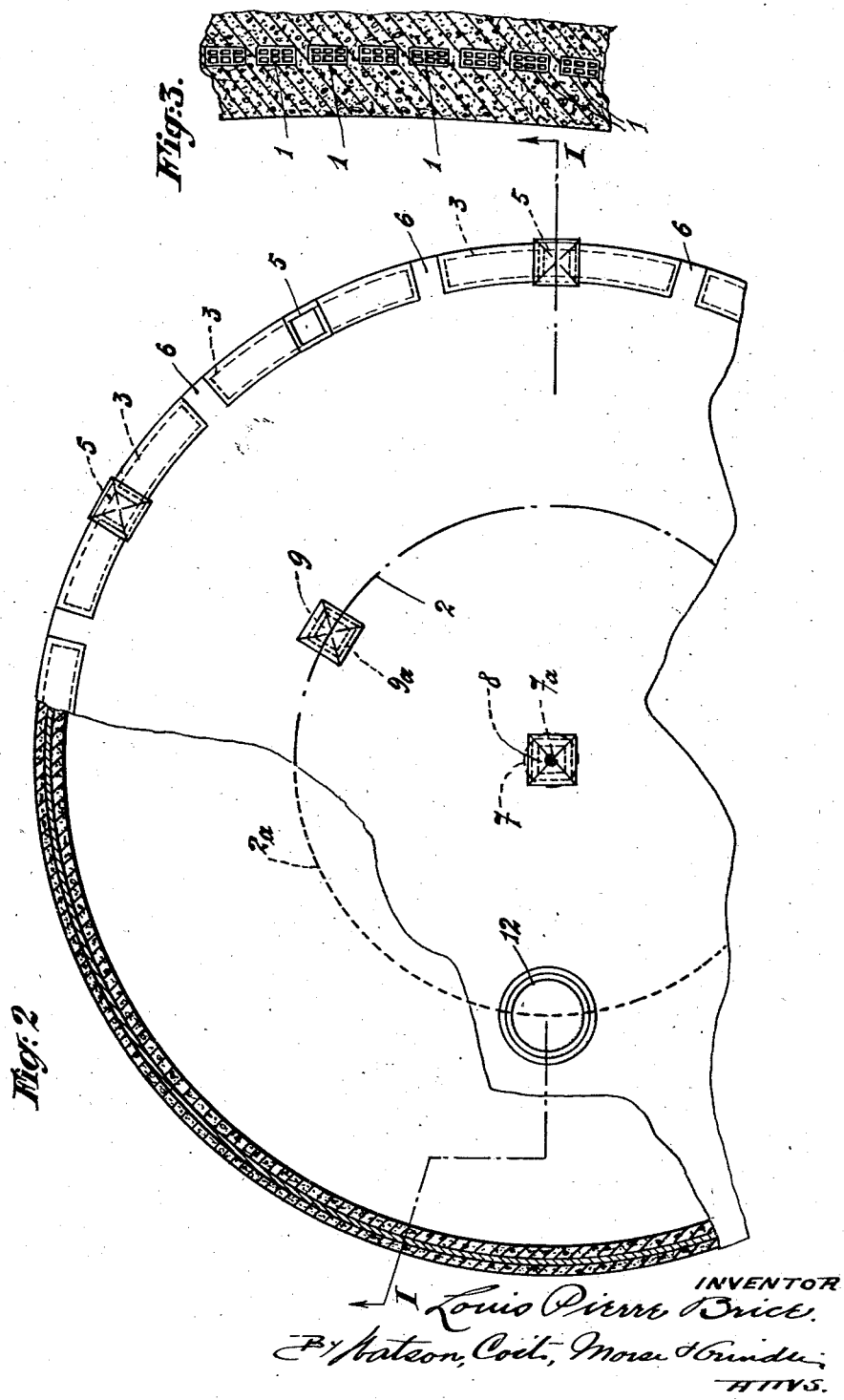

2,177,859

UNITED STATES PATENT OFFICE 2,177,859

REINFORCED CONCRETE TANK

Louis Pierre Brice, Paris, France, assignor to Societe Anonyme: La Parvi Hydraulique, Paris, France, a company of France Application December 7, 1937, Serial No. 178,581
In France December 15, 1936

6 Claims. (Cl. 72—14)

The present invention relates to reinforced concrete tanks intended to contain certain liquids which do not mix with water, such for instance as hydrocarbons.

The object of the present invention is to provide a reinforced concrete tank of the kind above mentioned which is perfectly fluid tight.

There exist tanks of this kind which are made of two elementary concrete vessels fitting in each other in such manner as to leave a continuous space between their lateral walls and their bottoms respectively, said space being filled up with water. The concrete pores, and especially those of the inner vessel, which directly contains the hydrocarbon, are thus impregnated with water, which prevent leakage of the hydrocarbon.

This system involves considerable difficulties in view of the necessity of keeping the two elementary vessels at a constant distance from each other, especially concerning their bottoms.

Furthermore, the construction of these tanks having double walls is extremely expensive, because each elementary wall must be so made as to be capable of resisting the stresses resulting from the pressure of the liquids stored up in the reservoir, and, in the case of underground reservoirs, the stresses resulting from the external pressure of earth.

According to the essential feature of the present invention, I provide in the wall of a reinforced concrete tank made of a single vessel, channels or recesses which are filled with water, and the walls of which are porous, either as a result of the porosity of the concrete itself, or in any other way, the essential thing being that the water present in these channels or recesses can pass into the pores of concrete.

By way of non-limitative example, the channels can be formed by hollow bricks disposed at suitable intervals, or even in adjoining relation to one another and embedded in the concrete forming the wall of the tank.

Other features of the present invention will result from the following detailed description of a specific embodiment thereof.

A preferred embodiment of the present invention will be hereinafter described, with reference to the accompanying drawings, given merely by way of example, and in which:

Fig. 1 is a vertical sectional view of a reservoir made according to the present invention, this section being made along line I—I of Fig. 2;

Fig. 2 is a corresponding view of the same reservoir, partly in plan view and partly in horizontal section on the line II—II of Fig. 1;

Fig. 3 is a part sectional view on an enlarged scale of the wall of the tank shown in Figs. 1 and 2, this detail view showing the particular arrangement of the porous bricks.

The tank illustrated by the drawings is of the tore-shaped type, that is to say its geometrical surface is generated by the revolution about axis X—X of the meridian line M. In the wall of reinforced concrete of this tank, I provide porous and hollow bricks 1 arranged in strings or lines, so that each line of bricks forms a continuous conduit which extends as well in the bottom as in the vertical walls (in the example shown by the drawings, the lines of bricks also extend in the top of the tank, although this is not necessary). Each line of bricks is located in a radial plane (that is a meridian plane passing through the axis X—X). With such an arrangement, the lines of bricks are separated from one another by given intervals, in the vertical walls, whereas in the bottom and the top of the tank these intervals grow smaller as the distance from the center decreases, all the lines of bricks converging toward this center. If the intervals become too small in the vicinity of this center, I may stop these lines at a distance from said center, connect them through a circular channel arranged for instance along the dotted line 2a of Fig. 2, and provide, between this circular channel and the center, new lines of bricks at suitable angular interval from one another. Another advantage of these circular channels will be hereinafter indicated.

The channels constituted by the lines of bricks are filled with water (or with another suitable liquid of a density higher than that of the liquid present in the tank) and they are kept under head by means of troughs 3 distributed along the periphery of the top of the tank. These troughs are formed by recesses which are provided in the concrete wall, and into which open conduits 4 communicating with the lines of hollow bricks or prolonged parts of these lines.

Each of these troughs is provided with a peephole 5. Between these troughs 3 I provide intervals 6 at the height of the top of the tank in such manner as to avoid the accumulation of rain water on the top of the tank.

The central pillar 7, of reinforced concrete, arranged along the axis, is provided a vertical channel 7a opening above the tank and communicating with the lower lines of bricks. This vertical channel 7a permits the evacuation of the air pockets when the system of channels provided in the concrete structure is being filled. It may be provided, at the top, with a trough 8 filled with water, so as to place it under head. For the same purpose (to wit the evacuation of air) it will be advantageous to connect together the upper points of the lines of bricks in the top through a circular channel (dash and dot line 2 in Fig. 2) and to connect this circular channel 2a with a vertical tube which can also be provided with a trough 9 having a peep-hole 9a.

It will be readily understood that the water under pressure present in the hollow and porous bricks infiltrates into the pores of the concrete wall, which it finally fills up, thus preventing leakage of the liquid, not mixable with water and of lower density, present in the tank. Therefore, these bricks or channels play the same part as the continuous space provided between two walls in the prior systems above referred to but they avoid the disadvantages thereof.

The tank may be of the underground type. This is what is shown by the drawings. In this case, an excavation is first made, work being facilitated by the sinking of a concrete tubbing 10 as soon as the level comes below the layer of water bearing sands. At the bottom of the excavation, I make a floor 11 of a concrete of big pebbles, and on this floor I first build the bottom by proceeding in the following manner: a first layer of concrete, then porous bricks, and a second layer of concrete. The vertical walls will then be built gradually and the top will be made in the same manner as the bottom. After the tank has been finished, the excavation is filled up.

The tank above described is equipped with all the accessories of the usual kind, and in particular, a hole 12 provided with a suitable closure plate, so that it is possible to enter the tank for inspection purposes.

In a general way, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A tank, especially for liquids immiscible with water, and more particularly liquid hydrocarbons which comprises a single reinforced concrete vessel, at least the bottom and lateral walls of which are provided with recesses having between them partitions formed by the concrete of said vessels, and water containers made of porous material, fitted in said recesses, whereby water, in operation, impregnates the porous material of said containers and the concrete around the same.

2. A tank, especially for liquids immiscible with water, and more particularly liquid hydrocarbons which comprises a single reinforced concrete vessel, at least the bottom and lateral walls of which are provided with channels formed therein, hollow porous bodies fitted in said channels and forming water containers, whereby water, in operation, impregnates the porous material of said containers and the concrete around the same.

3. A tank, especially for liquids immiscible with water, and more particularly liquid hydrocarbons which comprises a single reinforced concrete vessel, at least the bottom and lateral walls of which are provided with channels formed therein, hollow porous bricks piled in said channels and having their hollows aligned so as to form water containers, whereby water, in operation, impregnates the porous material of said containers and the concrete around the same.

4. A tank especially for liquids immiscible with water and more particularly liquid hydrocarbons such as gasoline, which comprises a single reinforced concrete vessel, at least the bottom and lateral walls of which are provided with channels formed therein, hollow porous bodies piled in said channels and having their hollows aligned so as to form water containers embedded in the concrete and means for keeping said containers filled with water, whereby water, in operation, impregnates the concrete around said channels.

5. A tank especially for liquids immiscible with water and more particularly liquid hydrocarbons such as gasoline, which comprises a single reinforced concrete vessel, at least the bottom and lateral walls of which are provided with channels formed therein, hollow porous bodies piled in said channels and having their hollows aligned so as to form water containers embedded in the concrete, at least one water tank above said first named tank and means for connecting said water tank with said containers, whereby water, in operation, impregnates the concrete around said channels.

6. A tank especially for liquids immiscible with water and more particularly liquid hydrocarbons such as gasoline, which comprises a single reinforced concrete vessel and hollow porous bodies embedded in the concrete and having their hollows aligned so as to form water containers embedded in the concrete, whereby water, in operation, impregnates the porous material of said containers and the concrete around the same.

LOUIS PIERRE BRICE.